US012583163B2

(12) United States Patent
Fuchii et al.

(10) Patent No.: US 12,583,163 B2
(45) Date of Patent: Mar. 24, 2026

(54) INJECTION MOLDING SYSTEM

(71) Applicant: SEIKO EPSON CORPORATION, Tokyo (JP)

(72) Inventors: Masashi Fuchii, Minowa-machi (JP); Yimei Ding, Shiojiri (JP); Naoki Iizuka, Shiojiri (JP); Hidenobu Maruyama, Azumino (JP); Kenta Anegawa, Matsumoto (JP); Yasuto Kanai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 70 days.

(21) Appl. No.: 18/597,001

(22) Filed: Mar. 6, 2024

(65) Prior Publication Data

US 2024/0300155 A1 Sep. 12, 2024

(30) Foreign Application Priority Data

Mar. 9, 2023 (JP) ................................. 2023-036195

(51) Int. Cl.
*B29C 45/76* (2006.01)
*B29C 45/17* (2006.01)
(Continued)

(52) U.S. Cl.
CPC ........ *B29C 45/768* (2013.01); *B29C 45/1769* (2013.01); *B29C 45/42* (2013.01);
(Continued)

(58) Field of Classification Search
None
See application file for complete search history.

(56) References Cited

U.S. PATENT DOCUMENTS 6,529,796 B1 * 3/2003 Kroeger ................ B29C 45/768
 700/202
12,011,861 B2 * 6/2024 Potaraju .................. B29C 44/60
 (Continued)

FOREIGN PATENT DOCUMENTS

JP H10-138310 A 5/1998
JP 6294268 B2 * 3/2018 ........... B29C 45/768
 (Continued)

OTHER PUBLICATIONS

Machine translation of JP2024107846A (Year: 2025).*
Machine translation of JP6294268B2 (Year: 2025).*
Machine translation of JP7522688B2 (Year: 2025).*

*Primary Examiner* — Emmanuel S Luk
(74) *Attorney, Agent, or Firm* — WORKMAN NYDEGGER

(57) ABSTRACT

An injection molding system includes a molding device, an inspection device configured to inspect a molded product and a control device that includes a storage unit, and a reception unit configured to receive a change content of a parameter included in a standard molding condition. The control device executes a first control of forming the molded product under a second molding condition in which the parameter is changed based on the change content, a second control of forming the molded product under a third molding condition in which the same parameter is changed, a third control of associating the second molding condition with an inspection result of the molded product formed under the second molding condition and storing the association, and a fourth control of associating the third molding condition with the inspection result of the molded product formed under the third molding condition and storing the association.

8 Claims, 13 Drawing Sheets

(51) Int. Cl.
    *B29C 45/42*     (2006.01)
    *B29C 45/77*     (2006.01)
    *B29C 45/78*     (2006.01)

(52) U.S. Cl.
    CPC ...... *B29C 45/7646* (2013.01); *B29C 45/7686*
    (2013.01); *B29C 45/77* (2013.01); *B29C 45/78*
    (2013.01); *B29C 2945/7613* (2013.01); *B29C*
    *2945/7619* (2013.01); *B29C 2945/76254*
    (2013.01); *B29C 2945/7629* (2013.01); *B29C*
    *2945/76461* (2013.01); *B29C 2945/76464*
    (2013.01); *B29C 2945/76498* (2013.01); *B29C*
    *2945/76511* (2013.01); *B29C 2945/76531*
    (2013.01); *B29C 2945/76561* (2013.01); *B29C*
    *2945/76571* (2013.01); *B29C 2945/76605*
    (2013.01); *B29C 2945/76615* (2013.01); *B29C*
    *2945/76936* (2013.01)

(56) References Cited

U.S. PATENT DOCUMENTS

| | | | | |
|---|---|---|---|---|
| 12,275,178 | B2 * | 4/2025 | Nigl | G05B 13/042 |
| 2003/0075818 | A1 * | 4/2003 | Morwald | B29C 45/84 |
| | | | | 425/162 |
| 2003/0154004 | A1 * | 8/2003 | Kroeger | G05D 23/1934 |
| | | | | 700/202 |
| 2005/0082707 | A1 * | 4/2005 | Sabin | B29C 45/7686 |
| | | | | 425/166 |
| 2006/0082010 | A1 * | 4/2006 | Saggese | B22D 17/007 |
| | | | | 264/40.5 |
| 2008/0290541 | A1 * | 11/2008 | Baumann | B29C 45/2725 |
| | | | | 264/40.6 |
| 2016/0114507 | A1 * | 4/2016 | Uchiyama | B29C 45/42 |
| | | | | 425/556 |
| 2016/0274561 | A1 * | 9/2016 | Stone | B29C 45/766 |
| 2016/0361855 | A1 * | 12/2016 | Shiraishi | B29C 45/74 |
| 2018/0001531 | A1 * | 1/2018 | Lawless, III | B29C 45/1782 |
| 2018/0104875 | A1 * | 4/2018 | Hoeglinger | B29C 45/80 |
| 2018/0141252 | A1 * | 5/2018 | Lawless, III | B29C 45/762 |
| 2020/0230856 | A1 * | 7/2020 | Enomoto | B29C 45/12 |
| 2021/0086426 | A1 * | 3/2021 | Sasagawa | B29C 45/62 |
| 2021/0187810 | A1 * | 6/2021 | Shiraishi | B29C 45/768 |
| 2021/0247754 | A1 * | 8/2021 | Takahashi | B29C 45/76 |
| 2021/0316460 | A1 * | 10/2021 | Rella | B25J 9/1671 |
| 2021/0370568 | A1 * | 12/2021 | Shimada | B29C 45/77 |
| 2022/0024098 | A1 * | 1/2022 | Montague, II | B29C 45/766 |
| 2022/0055268 | A1 | 2/2022 | Maruyama | |
| 2022/0143887 | A1 * | 5/2022 | Minowa | B29C 45/0055 |
| 2022/0143888 | A1 * | 5/2022 | Kodaira | B29C 45/1742 |
| 2022/0155760 | A1 * | 5/2022 | Otsuki | G05B 19/4188 |
| 2022/0184869 | A1 * | 6/2022 | Birchmeier | B29C 45/766 |
| 2022/0339837 | A1 * | 10/2022 | Hirano | G06N 3/088 |
| 2022/0402183 | A1 * | 12/2022 | Hirano | G05B 19/41875 |
| 2023/0039170 | A1 * | 2/2023 | Atsuta | G05B 19/41875 |
| 2023/0092818 | A1 * | 3/2023 | Kimura | B29C 45/42 |
| | | | | 700/197 |
| 2023/0124802 | A1 * | 4/2023 | Mosca | B29C 45/7686 |
| | | | | 425/534 |
| 2024/0109234 | A1 * | 4/2024 | Furokawa | G05B 19/4063 |
| 2024/0193385 | A1 * | 6/2024 | Yamasaki | B22D 18/02 |
| 2024/0253285 | A1 * | 8/2024 | Yamazaki | B29C 45/766 |

FOREIGN PATENT DOCUMENTS

| | | | | |
|---|---|---|---|---|
| JP | 2022-034692 | A | 3/2022 | |
| JP | 2022-126277 | A | 8/2022 | |
| JP | 7522688 | B2 * | 7/2024 | B29C 45/77 |
| JP | 2024107846 | A * | 8/2024 | B29C 45/768 |

* cited by examiner

| MOLDING DEVICE | INJECTION CONTROL MECHANISM | VISCOSITY |
| | | CYLINDER TEMPERATURE |
| | | CYLINDER INTERNAL PRESSURE |
| | | COOLING TIME (MEASUREMENT STANDBY TIME) |
| | | PRESSURE HOLDING TIME |
| | | FILLING TIME |
| | | MAXIMUM FORWARD PRESSURE |
| | | MOST ADVANCED POSITION |
| | | PEAK PRESSURE (SV2 TORQUE) |
| | | STROKE |
| | | INJECTION START POSITION |
| | MEASUREMENT RELATION | VISCOSITY |
| | | CYLINDER TEMPERATURE |
| | | CYLINDER INTERNAL PRESSURE |
| | | MEASUREMENT END POSITION |
| | | MEASUREMENT TIME (PLASTICIZATION TIME) |
| | PLASTICIZING DEVICE | VISCOSITY |
| | | SHEAR STRESS 1 |
| | | SHEAR STRESS 2 |
| | | SHEAR STRESS 3 |
| | | BARREL TEMPERATURE INSIDE |
| | | WITHIN BARREL TEMPERATURE |
| | | BARREL TEMPERATURE OUTSIDE |
| | | SCREW ROTATION SPEED |
| | | SV1 TORQUE |
| | HOPPER | VISCOSITY |
| | | MOISTURE AMOUNT 3 |
| | | STANDBY TIME |
| | | HUMIDITY |
| | | TEMPERATURE |

| COMPONENT No. | PA73(ROLLER PAPER GUIDE) | | | | COMPONENT SHAPE AND SIZE | | | | |
|---|---|---|---|---|---|---|---|---|---|
| PRODUCTION SPECIFICATION | MOLDING PLACE | | | | H | — | mm | W | 6.009 | mm |
| | DEVICE | INTEGRATED SYSTEM MACHINE AE-S3 | | | T | — | mm | WEIGHT | 0.0562 | g |
| | MATERIAL | POM | MODEL | FX-11J | | | | | |
| | COLOR | NATURAL | NUMBER OF COMPONENT TO BE TAKEN | 6 PIECES | | | | | |
| | COLORING | — | C/T | 30sec | | | | | |
| | MANUFAC-TURER | MITSUBISHI | GATE | PIN GATE | | | | | |

| | | | | | |
|---|---|---|---|---|---|
| A. PLASTICIZING CONDITION | BARREL TEMPERATURE | (INSIDE) | 210 | °C | SCREW ROTATION SPEED | 50 | rpm |
| | | (OUTSIDE) | 210 | °C | SUCK BACK AMOUNT | 0 | mm |
| | BODY TEMPERATURE | | 220 | °C | SUCK BACK SPEED | 0.1 | mm/s |
| | Tip | | ON | | Tip OUTPUT | 5 | % |
| B. INJECTION CONDITION | MEASUREMENT SPEED | | 2 | mm/s | MEASUREMENT POSITION | 15 | mm |
| | INJECTION SPEED | 1 | 55 | mm/s | SPEED SWITCHING POSITION | 7 | mm/s |
| | | 2 | 55 | mm/s | V-P SWITCHING POSITION | 3.8 | mm/s |
| C. PRESSURE HOLDING CONDITION | PRESSURE HOLDING | 1 | 35 | Mpa | PRESSURE HOLDING TIME | 1 | 1.5 | sec |
| | | 2 | 35 | Mpa | | 2 | 0 | sec |
| D. COOLING CONDITION | MOLD TEMPERATURE | | 70 | °C | COOLING TIME | 8 | sec |
| E. RESTRICTION CONDITION | MAXIMUM PRESSURE DURING INJECTION | | 208 | Mpa | RESTRICTION SPEED DURING INJECTION HOLDING PRESSURE | 5 | mm/s |

| COMPONENT No_PA73 (Cav_No.2, NUMBER OF TIMES OF SHOTS_THREE TIMES) | | | | | | |
|---|---|---|---|---|---|---|
| PHYSICAL PROPERTY | | MOLDING CONDITION | | INSPECTION DATA | | |
| MATERIAL | POM | BARREL TEMPE-RATURE (°C) | 200 | SHAPE | NG_INSUFFI-CIENT FILLING | |
| FORMAT | FX11J | BODY TEMPE-RATURE (°C) | 210 | DIMEN-SION | NG | |
| COLOR | NATURAL | Tip | ON | WEIGHT (g) | 0.0503 | |
| ⋮ | | ⋮ | | ⋮ | | |
| ⋮ | | ⋮ | | ⋮ | | |

| BARREL TEMPERATURE (°C) | 200 | 205 | 210 | 215 |
|---|---|---|---|---|
| SHAPE | NG | NG | GOOD | GOOD |
| | | | | |
| DIMENSION | NG | NG | GOOD | GOOD |
| WEIGHT (g) | 0.0503 | 0.0559 | 0.0562 | 0.0558 |

INJECTION MOLDING SYSTEM

The present application is based on, and claims priority from JP Application Serial Number 2023-036195, filed Mar. 9, 2023, the disclosure of which is hereby incorporated by reference herein in its entirety.

BACKGROUND

1. Technical Field

The present disclosure relates to an injection molding system.

2. Related Art

Disclosed is a technique for determining a molding condition in which a degree of molding defects is within a desired value by predicting the degree of molding defects from molding conditions using a regression analysis. For example, in an injection molding system disclosed in JP-A-10-138310, a deformation amount and a degree of deform are predicted based on finite element model data for a molded product for a CAE analysis, a product redesign and the CAE analysis according to a CAD system are performed until the deformation amount and the degree of the deform are within a desired value to determine an optimal molding condition, then design and manufacture of a mold is performed, and injection molding is performed under molding conditions according to the optimal molding condition using the mold.

JP-H10-138310A is an example of the related art.

However, in the technique disclosed in JP-A-H10-138310, there is a problem that a deviation from an actual molding result may occur. Specifically, as in the above related art, when the quality is virtually predicted and the molding condition is determined, only a part of factors affecting quality can be taken into account, and there is a possibility that a deviation from a molding result in an actual molded product occurs.

That is, there is a demand for an injection molding system capable of deriving more optimal molding conditions.

SUMMARY

An injection molding system according to an aspect of the present application includes: a molding device configured to discharge a material into a molding pattern and perform injection-mold to form a molded product according to a molding condition; an inspection device configured to inspect at least one of a shape and a weight of the molded product; a robot configured to convey the molded product from the molding device to the inspection device; and a control device. The control device includes a storage unit, and a reception unit configured to receive a change content of a parameter included in a standard molding condition which is the predetermined molding condition, and the control device executes a first control of causing the molding device to form the molded product under a second molding condition in which the parameter is changed in accordance with the change content received by the reception unit, a second control of causing the molding device to form the molded product under a third molding condition in which the same parameter as the parameter changed in the first control is changed, a third control of associating the second molding condition with an inspection result, obtained by the inspection device, of the molded product formed under the second molding condition and storing the association in the storage unit, and a fourth control of associating the third molding condition with the inspection result of the molded product formed under the third molding condition and storing the association in the storage unit, and the third molding condition is a condition different from the second molding condition.

BRIEF DESCRIPTION OF THE DRAWINGS

FIG. 7 is a cross-sectional view of a peripheral portion of the barrel.

FIG. 8 is a list showing an example of parameters of molding conditions.

FIG. 9 is a list showing an example of basic information of components.

FIG. 10 is a list showing an example of standard molding conditions.

FIG. 12 is a table showing an example of molded product data.

FIG. 13 is a table showing a correlation between a barrel temperature and an inspection result.

FIG. 16 is a graph showing a contribution rate of each parameter to a molding condition.

DESCRIPTION OF EMBODIMENTS

First Embodiment

Outline of Injection Molding System

Figure 1:
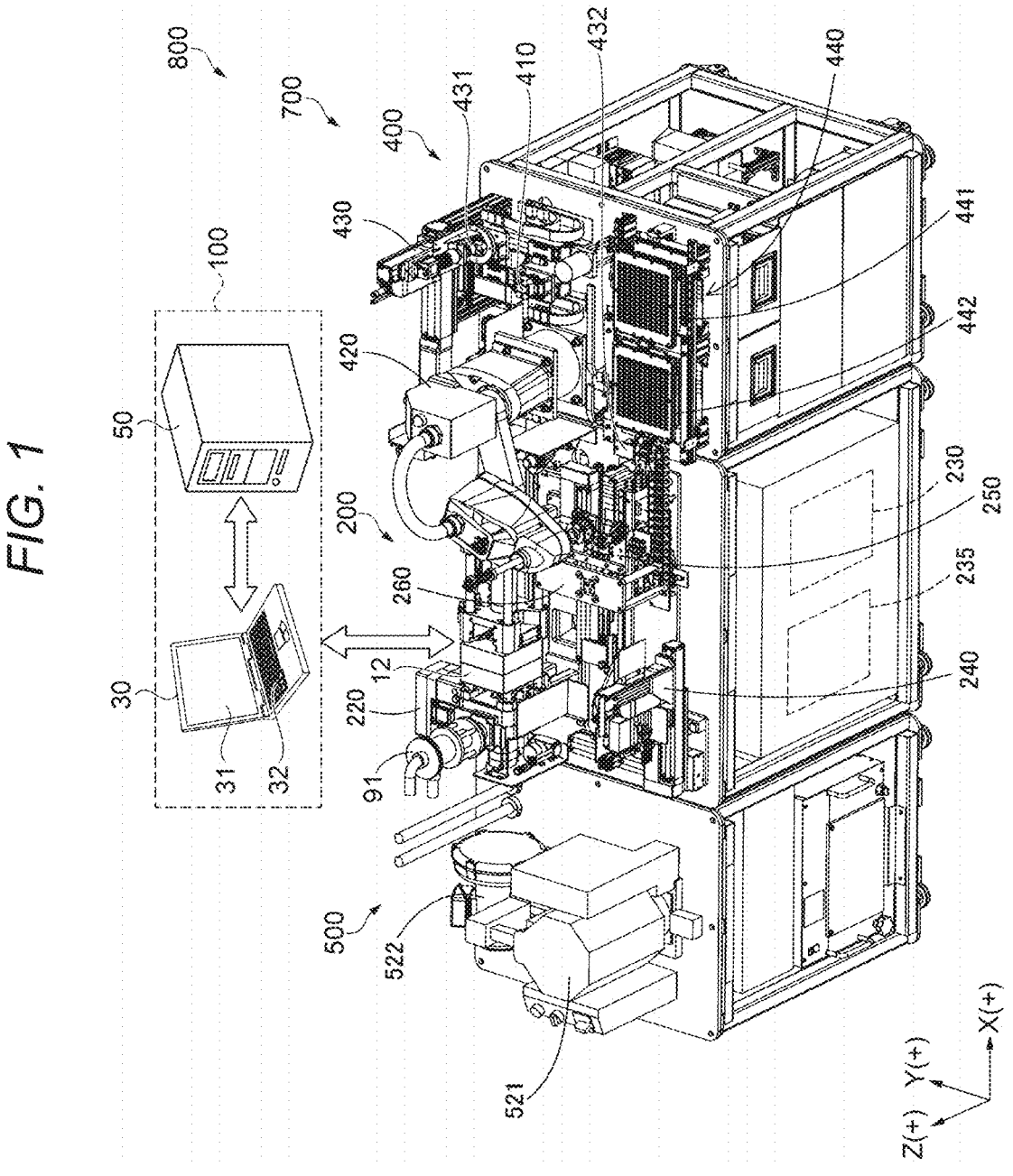
FIG. 1 is a perspective view showing an outline of an injection molding system according to a first embodiment.

FIG. 1 is a perspective view showing an outline of an injection molding system according to a first embodiment.

An X axis, a Y axis, and a Z axis which are three axes orthogonal to one another are shown in the drawings including FIG. 1. Specifically, an extending direction of an injection molding apparatus 700 is an X plus direction, a depth direction is a Y plus direction, and a height direction is a Z plus direction. A direction along the X axis including the X plus direction and an X minus direction is also referred to as an X direction. Similarly, a direction along the Y axis is also referred to as a Y direction, and a direction along the Z axis is also referred to as a Z direction.

As shown in FIG. 1, an injection molding system 800 includes the injection molding apparatus 700 including a molding device 220, and a control device 100 that controls operations of the injection molding apparatus 700.

The injection molding apparatus 700 includes a material supply unit 500, an injection molding unit 200, and an inspection accommodation unit 400. The three units are disposed side by side in the X plus direction in an order of the material supply unit 500, the injection molding unit 200, and the inspection accommodation unit 400.

The material supply unit 500 includes a material dryer 521, a material supply unit 522, and the like. The material dryer 521 is a material storage unit and stores a pellet-shaped resin material. The material stored in the material dryer 521 is dehumidified and dried in the material dryer 521.

The material supply unit 522 is a loader including a conveyor that conveys a material. The material of the material dryer 521 is press-fed to a hopper 91 of the molding device 220 by the material supply unit 522.

The injection molding unit 200 includes the molding device 220, a controller 230, a molding pattern temperature regulator 235, a removal device 240, a transport device 250, a gate cutting device 260, and the like. As shown in FIG. 1, the molding device 220, the removal device 240, the transport device 250, and the gate cutting device 260 are disposed on an upper surface of the injection molding unit 200. The controller 230 and the molding pattern temperature regulator 235 are accommodated inside the injection molding unit 200. A molding pattern 12 is detachably attached to the molding device 220. The molding device 220 injects a plasticized material into the molding pattern 12 to form a molded product. The molding pattern 12 may be made of metal or a resin. The molding pattern 12 is also referred to as a mold. The molding device 220 is provided with the hopper 91 that receives the supply of the material. "Plasticize" in the embodiment is a concept including melting, and refers to changing from a solid state to a flowable state. Specifically, for a material in which glass transition occurs, "plasticize" refers to setting a temperature of the material to a temperature equal to or higher than a glass transition point. For a material in which glass transition does not occur, "plasticize" refers to setting a temperature of the material to a temperature equal to or higher than a melting point.

The controller 230 is a device that performs overall control of the molding device 220, the removal device 240, the transport device 250, as well as a robot 420, an inspection device 430, and a stacking mechanism 440, which will be described later. The controller 230 is implemented by a programmable logic controller (PLC). The controller 230 is coupled to the control device 100, and causes the molding device 220 to perform molding in accordance with molding conditions transmitted from the control device 100. In other words, the molding device 220 discharges the material to the molding pattern 12 in accordance with the molding conditions to perform injection molding to form the molded product.

The molding pattern temperature regulator 235 is a temperature control device for circulating a heat medium in a cooling pipe provided on the molding pattern 12 and maintaining a temperature of the molding pattern 12 at a constant temperature.

The removal device 240 is a device that removes the molded product formed and released by the molding device 220 from the molding pattern 12. The removal device 240 is disposed in front of the molding device 220, that is, on a Y minus direction side. The removal device 240 includes a hand that grips the molded product and a linear actuator that moves the hand along the X direction and the Y direction.

The removal device 240 removes the molded product from the molding device 220 by the hand, moves the molded product removed from the molding device 220 to an end portion of the transport device 250 on an X minus direction side by the linear actuator, and places the molded product on the transport device 250.

The transport device 250 is a device that transports the molded product removed by the removal device 240. The transport device 250 is disposed in front of the molding device 220, that is, on the Y minus direction side. The transport device 250 is disposed adjacent to the removal device 240 on an X plus direction side. The transport device 250 is implemented by a linear actuator capable of moving a molded product along the X direction. The transport device 250 moves the molded product placed on the transport device 250 by the removal device 240 toward an end portion on the X plus direction side from the end portion on the X minus direction side. A gate cutting device 260 that cuts off a gate portion and a runner remaining on the molded product is disposed on the transport device 250. The gate cutting device 260 cuts off the gate portion and the runner of the molded product being transported on the transport device 250 during the transportation.

The inspection accommodation unit 400 includes the robot 420, the inspection device 430, the stacking mechanism 440, and the like.

The robot 420 is a device that moves the molded product transported by the transport device 250. In the embodiment, the robot 420 is implemented as a scalar robot. A controller for controlling the robot 420 is integrally incorporated in the robot 420. The robot 420 grips the molded product transported to the end portion of the transport device 250 in the X plus direction by the transport device 250, and moves the molded product to an inspection stage 410 of the inspection device 430. Further, the robot 420 moves the molded product on which an inspection is completed by the inspection device 430 to a tray on the stacking mechanism 440, and places the molded product on the tray. The robot 420 is not limited to the scalar robot, and may be implemented by a vertical articulated robot having a plurality of axes. In other words, the robot 420 conveys the molded product from the molding device 220 to the inspection device 430. The removal device 240 and the transport device 250 may be omitted, and the robot 420 may directly remove the molded product from the molding device 220 and move the molded product to the inspection stage 410.

The inspection device 430 is disposed adjacent to the robot 420 on the X plus direction side. The inspection device 430 includes an imaging unit 431 for capturing an image of the molded product, and a weight measurement unit 432 for measuring a weight of the molded product.

The imaging unit 431 is a camera including an imaging element such as a charge coupled device (CCD) sensor or a complementary metal oxide semiconductor (CMOS) sensor, and also includes an illumination unit. The imaging unit 431 images the molded product on the inspection stage 410, and the inspection device 430 analyzes the captured image, and performs an inspection on appearance including a shape of the molded product. After the appearance inspection ends, the molded product is moved to the weight measurement unit 432 by the robot 420.

The weight measurement unit 432 is a weight measurement unit including a weight sensor such as a load cell. The inspection device 430 measures a weight of the molded product placed on the weight measurement unit 432. After the appearance inspection ends, the molded product is moved to the tray on the stacking mechanism 440 by the robot 420. The molded product determined as a defective product by the inspection device 430 is discharged to a predetermined defective product discharge region by the robot 420. In other words, the inspection device 430 inspects at least one of the shape and the weight of the molded product.

The stacking mechanism 440 is an accommodation mechanism that stacks trays for accommodating inspected molded products transported from the inspection device 430 by the robot 420. The stacking mechanism 440 is disposed on the Y minus direction side of the robot 420.

The stacking mechanism 440 includes a first lifting device 441 and a second lifting device 442. The robot 420 disposes a predetermined number of molded products on a tray disposed on the first lifting device 441. When the predetermined number of molded products are disposed on the tray, the first lifting device 441 lowers the tray. A tray disposed at an uppermost portion of the second lifting device 442 is slid and moved by a slide mechanism, and is disposed on the lowered tray. The movement of the tray from the second lifting device 442 to the first lifting device 441 may be performed by the robot 420. A plurality of trays are stacked on the second lifting device 442, and when the uppermost tray moves to the first lifting device 441, the second lifting device 442 raises the remaining trays. In this manner, when the tray on which the predetermined number of molded products are disposed is stacked on the first lifting device 441, the manufacturing of the molded product is temporarily paused. A replenishing door is provided at a lower portion of the stacking mechanism 440, and by opening the door, trays stacked inside are removed, and new trays can be replenished to the second lifting device 442.

The control device 100 includes a computer 30, a server 50, and the like.

In a preferred example, the computer 30 uses a notebook computer including a display unit 31 including a liquid crystal panel and an operation unit 32 including by a keyboard. The operation unit 32 may be a touch panel provided on the display unit 31 or a mouse. The server 50 is a server having higher information processing capability than that of the computer 30, and is connected to the computer 30 in a Local Area Network (LAN) environment, for example.

Figure 2:
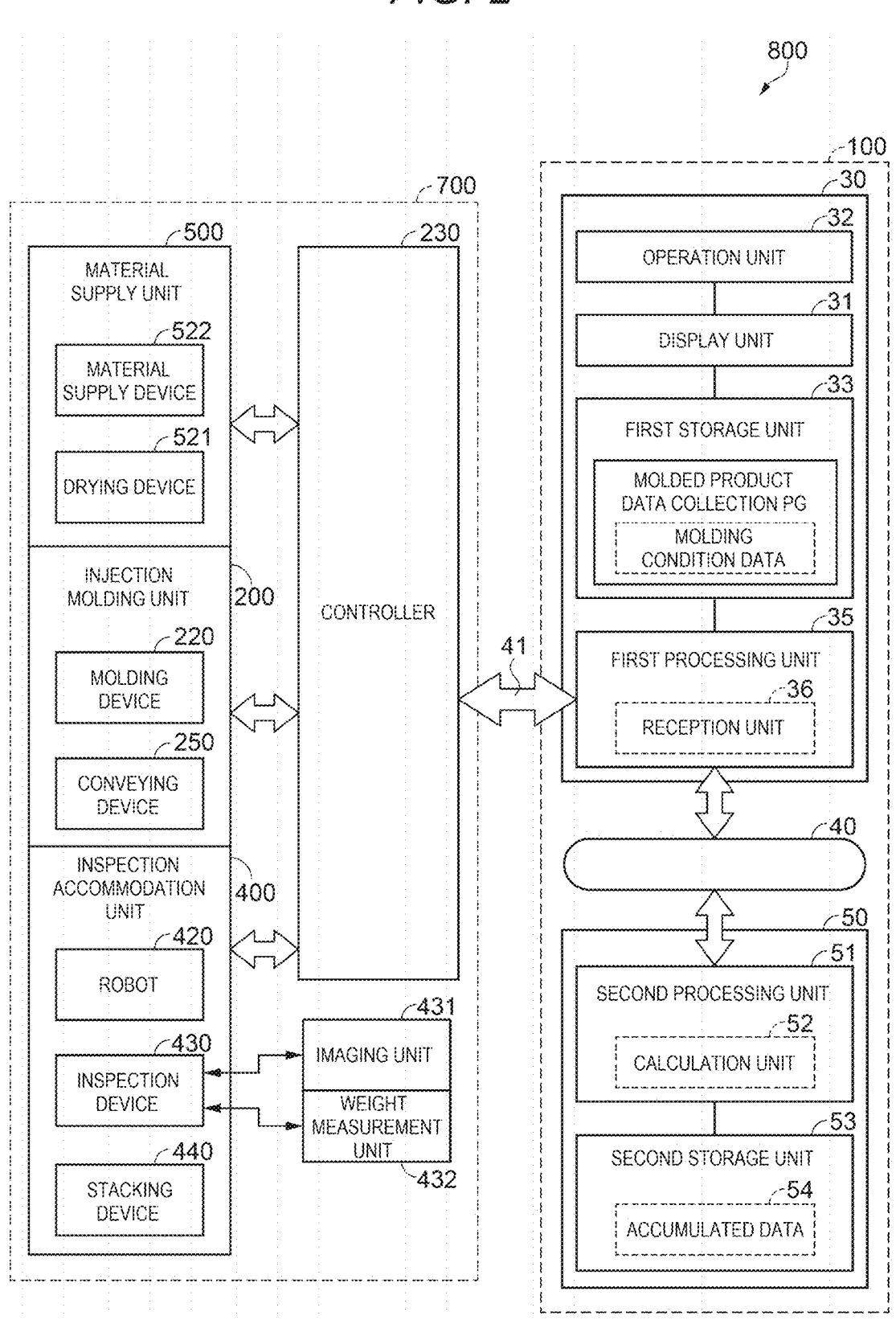
FIG. 2 is a functional block diagram of the injection molding system.

FIG. 2 is a functional block diagram of the injection molding system.

As shown in FIG. 2, the computer 30 includes the display unit 31, the operation unit 32, a first storage unit 33, a first processing unit 35, and the like.

The first storage unit 33 includes a random access memory (RAM) and a read only memory (ROM). The RAM is used for temporary storage of various data and the like, and the ROM stores a control program for controlling the operations of the injection molding apparatus 700, accompanying data, and the like. The control program stores, for example, a molded product data collection program that defines an order and contents of processes when molded product data is collected. The accompanying data includes a standard molding condition for each component, a plurality of molding conditions, and a plurality of pieces of parameter information.

The first processing unit 35 includes one or a plurality of processors, and integrally controls operations of each unit. The first processing unit 35 includes an interface circuit with a peripheral device, a calculation device, and a register. When the molded product data collection program is executed, the first processing unit 35 functions as a reception unit 36, receives a change content of the molding conditions, and transmits the change content to the controller 230 of the injection molding apparatus 700. In other words, the control device 100 includes the first storage unit 33 that stores a plurality of molding conditions and the reception unit 36 that receives the change content of the molding conditions.

The server 50 includes a second processing unit 51, a second storage unit 53, and the like. The server 50 also includes an operation unit, a display unit, and the like, but the operation unit, the display unit, and the like are not shown.

The second processing unit 51 includes one or a plurality of processors, an interface circuit with a peripheral device, a calculation device, a register, and the like.

The second storage unit 53 includes a large-capacity storage device such as a hard disk drive (HDD) in addition to the RAM and the ROM.

The second processing unit 51 functions as a calculation unit 52, and the calculation unit 52 performs multiple regression analysis using a plurality of pieces of acquired data in which the molding conditions are changed, and calculates analysis data including a contribution rate for each parameter.

In a preferred example, the computer 30 and the server 50 are connected to each other via a LAN 40 such that the computer 30 and the server 50 can communicate with each other in two directions. The computer 30 and the server 50 may be connected via the Internet. The control device 100 is not limited to including two devices, and may be implemented by a single computer as long as the computer can perform the same functions, or a plurality of servers may be connected to the computer 30.

The computer 30 and the controller 230 of the injection molding apparatus 700 are connected by, for example, a communication cable 41.

The controller 230 controls each unit including the molding device 220 of the injection molding apparatus 700 according to the molding conditions received from the computer 30 to form the molded product.

Configuration of Molding Device

Figure 3:
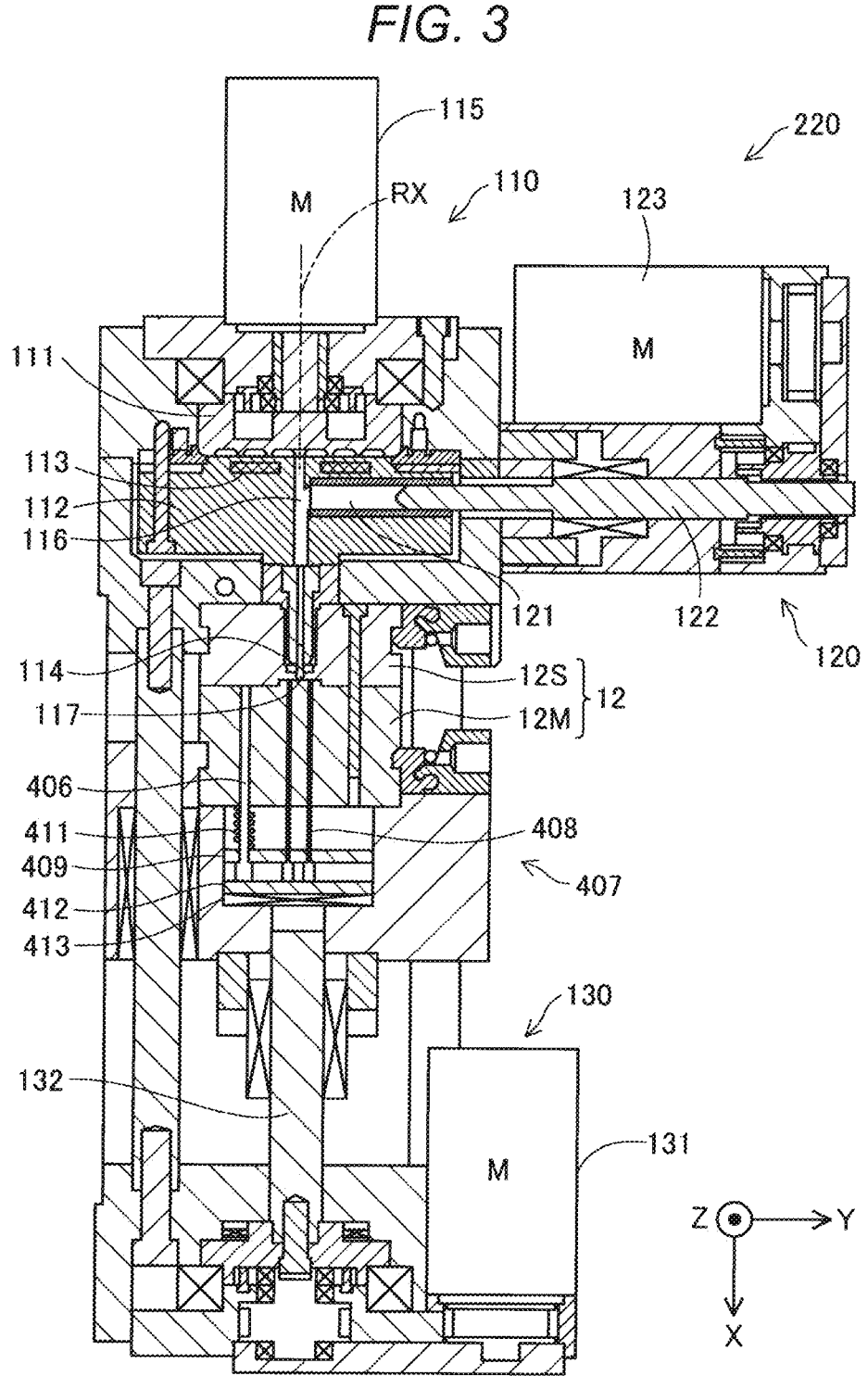
FIG. 3 is a cross-sectional view of a main part showing a schematic configuration of a molding device.
Figure 4:
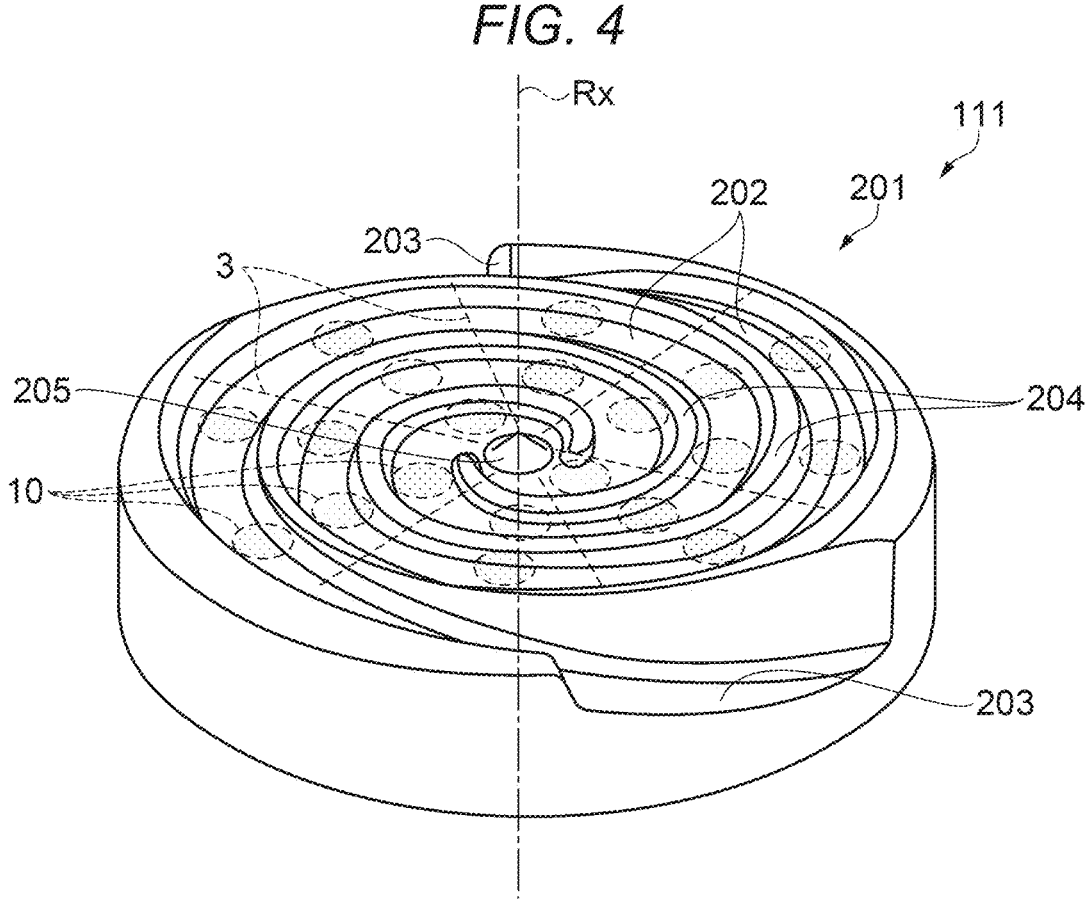
FIG. 4 is a perspective view of a flat screw.
Figure 6:
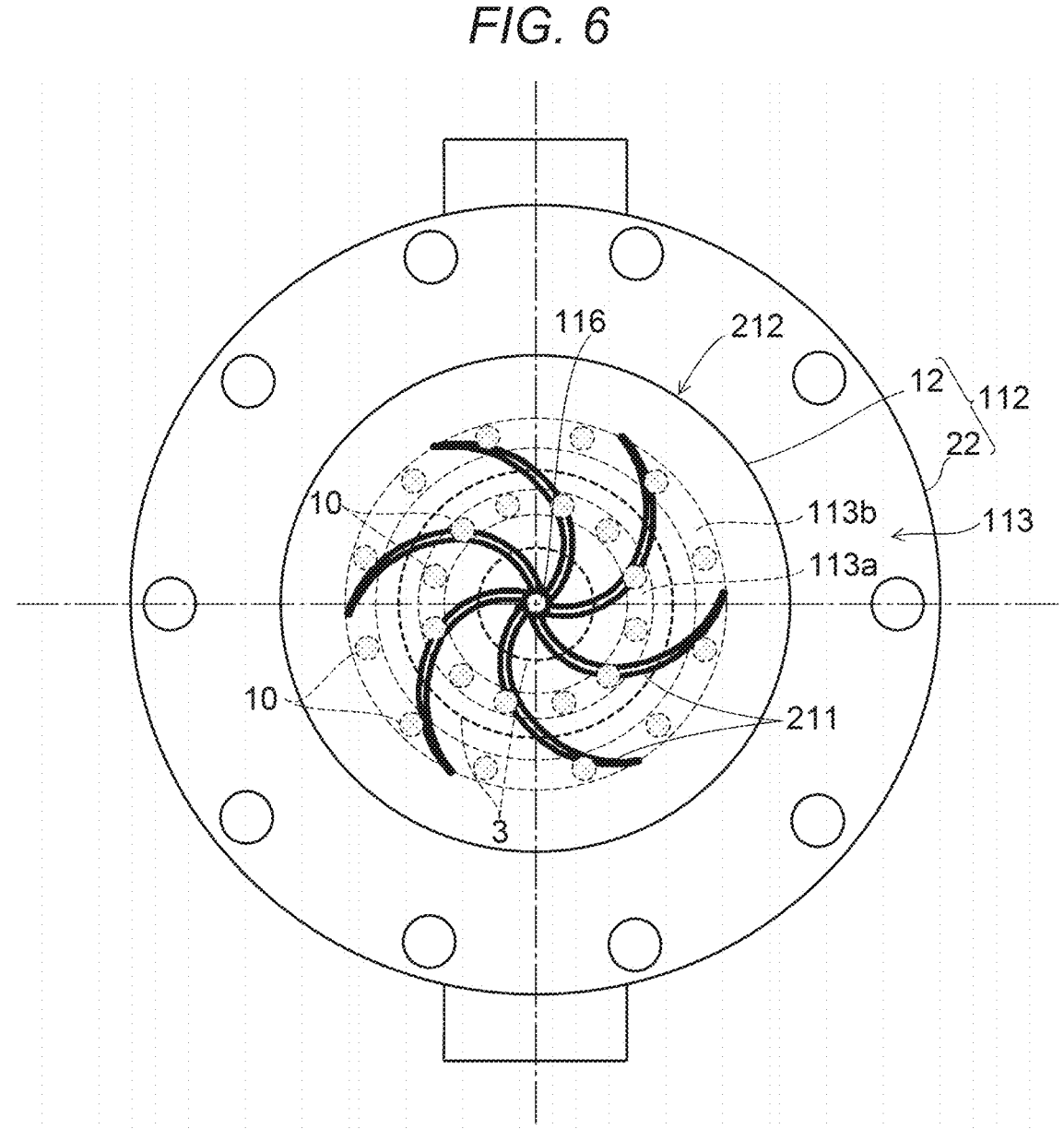
FIG. 6 is a plan view of a barrel.

FIG. 3 is a cross-sectional view of a main part showing a schematic configuration of the molding device. FIG. 4 is a perspective view of a flat screw. FIG. 6 is a plan view showing a barrel.

The molding device 220 includes a plasticizing device 110, an injection control mechanism 120, the molding pattern 12, a mold clamping device 130, and the like.

The plasticizing device 110 includes a flat screw 111, a barrel 112, a heater 113, a nozzle 114, and a screw driving unit 115. The flat screw 111 is driven to rotate about a rotation axis RX by the screw driving unit 115 including a motor. A communication hole 116 is formed at a center of the barrel 112. A cylinder 121 to be described later is coupled to the communication hole 116. The rotation of the flat screw 111 driven by the screw driving unit 115 and heating performed by the heater 113 are controlled by the controller 230.

As shown in FIG. 4, the flat screw 111 has a substantially cylindrical shape whose height in an axial direction, which is a direction along the rotation axis RX, is smaller than a diameter. Spiral groove portions 202 are formed around a center portion 205 on a groove forming surface 201 facing the barrel 112 in the flat screw 111. The groove portions 202 communicate with material inlets 203 formed in a side surface of the flat screw 111.

A material supplied from the hopper 91 (FIG. 1) is supplied to the groove portions 202 through the material inlets 203. The groove portions 202 are formed by being separated by ridge portions 204. Although FIG. 4 shows an example in which two groove portions 202 are formed, the number of the groove portions 202 may be one, or three or more. A shape of the groove portion 202 is not limited to the spiral shape, and may have a helical shape or an involute curve shape, or may have a shape extending in an arc from the center portion 205 toward an outer periphery.

As shown in FIG. 6, the barrel 112 has a facing surface 212 facing the groove forming surface 201 of the flat screw 111. The communication hole 116 is formed at a center of the facing surface 212. A plurality of guide grooves 211 coupled to the communication hole 116 and extending in a spiral shape from the communication hole 116 toward the outer periphery are formed in the facing surface 212.

The material supplied to the groove portions 202 of the flat screw 111 flows along the groove portions 202 and the guide grooves 211 by the rotation of the flat screw 111 while being plasticized between the flat screw 111 and the barrel 112 by the rotation of the flat screw 111 and the heating of the heater 113, and is guided to the center portion 205 of the flat screw 111. The material flowing into the center portion 205 is guided from the communication hole 116 provided at the center of the barrel 112 to the injection control mechanism 120. The guide grooves 211 may not be provided.

As shown in FIG. 3, the injection control mechanism 120 includes the cylinder 121, a plunger 122, and a plunger driving unit 123. The injection control mechanism 120 has a function of injecting a plasticized material in the cylinder 121 into a cavity 117 to be described later. The injection control mechanism 120 controls an injection amount of the plasticized material from the nozzle 114 under the control of the controller 230. The cylinder 121 is a substantially cylindrical member coupled to the communication hole 116 of the barrel 112, and includes the plunger 122 inside. The plunger 122 slides inside the cylinder 121, and press-feeds the plasticized material in the cylinder 121 to the nozzle 114 provided in the plasticizing device 110. The plunger 122 is driven by the plunger driving unit 123 including a motor.

In the embodiment, the nozzle 114 is implemented as a hot runner nozzle. A heater is disposed around the nozzle 114, and a temperature of the nozzle 114 is adjusted by a hot runner controller (not shown) controlling the heater.

The molding pattern 12 includes a movable molding pattern 12M and a fixed molding pattern 12S. The movable mold 12M and the fixed mold 12S are provided to face each other, and have the cavity 117 which is a space corresponding to the shape of the molded product therebetween. The plasticized material is press-fed to the cavity 117 by the injection control mechanism 120 and is injected from the nozzle 114.

The mold clamping device 130 includes a mold driving unit 131, and opens and closes the movable molding pattern 12M and the fixed molding pattern 12S. Under the control of the controller 230, the mold clamping device 130 rotates a ball screw 132 by driving the mold driving unit 131 including a motor, and moves the movable molding pattern 12M coupled to the ball screw 132 with respect to the fixed molding pattern 12S to open and close the molding pattern 12. That is, the fixed molding pattern 12S is stationary in the injection molding system 800, and the molding pattern 12 is opened and closed by moving the movable molding pattern 12M with respect to the stationary fixed molding pattern 12S.

In a state where the molding pattern 12 is mounted on the molding device 220, a pushing mechanism 407 for releasing the molded product from the molding pattern 12 is provided on the movable molding pattern 12M. The pushing mechanism 407 includes an ejector pin 408, a support plate 409, a support rod 406, a spring 411, a pushing plate 412, and a thrust bearing 413.

The ejector pin 408 is a rod-shaped member for extruding a molded product formed in the cavity 117. The ejector pin 408 is provided so as to pass through the movable mold 12M and be inserted into the cavity 117. The support plate 409 is a plate member that supports the ejector pin 408. The ejector pin 408 is fixed to the support plate 409. The support rod 406 is fixed to the support plate 409 and inserted into a through hole formed in the movable mold 12M. The spring 411 is disposed in a space between the movable mold 12M and the support plate 409, and is inserted into the support rod 406. The spring 411 biases the support plate 409, so that a head portion of the ejector pin 408 forms a part of a wall surface of the cavity 117 during molding. The pushing plate 412 is fixed to the support plate 409. The thrust bearing 413 is attached to the pushing plate 412 and is provided, so that a head portion of the ball screw 132 does not damage the pushing plate 412. A thrust sliding bearing or the like may be used instead of the thrust bearing 413.

Arrangement of Temperature Sensor and Pressure Sensor

As shown in FIG. 4, a plurality of pressure sensors 10 and temperature sensors 3 are disposed inside the groove forming surface 201 of the flat screw 111.

The plurality of pressure sensors 10 have a small circular plate shape in a plan view, and are disposed in a shape of a radiation line from the center portion 205 in portions overlapping the groove portions 202.

The plurality of temperature sensors 3 have a rod shape in the plan view, and are disposed in a shape of a radiation line from the center portion 205. As shown in FIG. 4, the plurality of pressure sensors 10 and the plurality of temperature sensors 3 are disposed so as not to overlap one another in the plan view.

Figure 5:
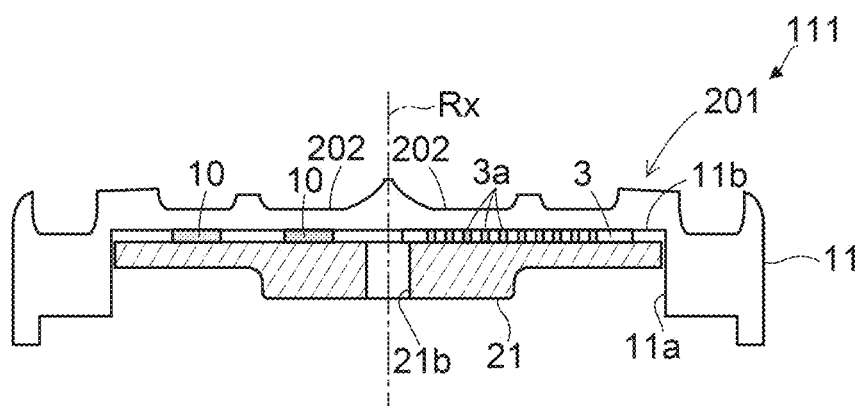
FIG. 5 is a cross-sectional view of the flat screw.

FIG. 5 is a cross-sectional view of the flat screw.

As shown in FIG. 5, the flat screw 111 includes two portions of a first portion 11 and a second portion 21. In a preferred example, both the first portion 11 and the second portion 21 are made of stainless steel. The first portion 11 and the second portion 21 may be made of aluminum.

The first portion 11 has the groove forming surface 201, and has a concave portion 11a for accommodating the second portion 21 on a back surface of the first portion 11.

The second portion 21 is a plate-shaped member, and a through hole 21b into which a drive shaft is inserted is provided at a center of the second portion 21. The first portion 11 and the second portion 21 are integrated with a coupling mechanism including a bolt (not shown), and rotate together with rotation of the drive shaft.

The pressure sensors 10 and the temperature sensors 3 are disposed between the first portion 11 and the second portion 21.

In FIG. 5, a cross section of the pressure sensor 10 is shown on a left side of the rotation axis RX. As shown in FIG. 5, the pressure sensor 10 is attached to a bottom surface of the groove portion 202. In a preferred example, the pressure sensor 10 is provided on a bottom surface 11b of the concave portion 11a of the first portion 11.

In a preferred example, the pressure sensor 10 uses a pressure sensor using a piezoelectric element. The pressure sensor 10 may be an individual discrete component, or may be formed by forming a film on the bottom surface 11b of the concave portion 11a of the first portion 11.

In FIG. 5, a cross section of the temperature sensor 3 is shown on a right side of the rotation axis RX.

As shown in FIG. 5, the temperature sensor 3 is provided on the bottom surface 11b of the concave portion 11a of the first portion 11. In a preferred example, the temperature sensor 3 uses a fiber Bragg grating (FBG) sensor including optical fibers. Specifically, the temperature sensor 3 includes a periodic diffraction grating 3a formed inside one optical fiber. The diffraction grating 3a is a portion where a refractive index is modulated, and reflects only light having a wavelength satisfying a Bragg reflection condition formed by a period of the diffraction grating 3a. A temperature can be measured by observing a Bragg wavelength of the reflected light. The temperature sensor 3 can also measure strain. The temperature sensor 3 is not limited to the FBG sensor, and may be a temperature sensor having high heat resistance, for example, a thermocouple sensor may be used.

The temperature sensors 3 and the pressure sensors 10 are electrically coupled to the controller 230, and detection data obtained by each sensor is transmitted to the first processing unit 35 of the computer 30. The first processing unit 35 can monitor temperatures and a pressures of sites where the sensors are disposed. For example, when a detected value deviates from a set value, the control can be performed, so that the detected value approaches the set value. The temperature sensor 3 and the pressure sensor 10 may be provided in the barrel 112.

Referring back to FIG. 6.

As shown in FIG. 6, the plurality of pressure sensors 10 and temperature sensors 3 are also disposed inside the barrel 112. The pressure sensors 10 and the temperature sensors 3 are the same sensors as those used for the flat screw 111.

As shown in FIG. 6, the heater 113 includes a circular ring-shaped heater 113a centered on the communication hole 116 and a concentric circular heater 113b having a larger diameter than that of the heater 113a and surrounding the heater 113a. The plurality of pressure sensors 10 are disposed at positions overlapping the heaters 113a and 113b.

Two temperature sensors 3 are provided, and one temperature sensor 3 is disposed in a circular ring shape between the communication hole 116 and the heater 113a. The other one is disposed in a circular ring shape between the heater 113a and the heater 113b.

Figure 7:
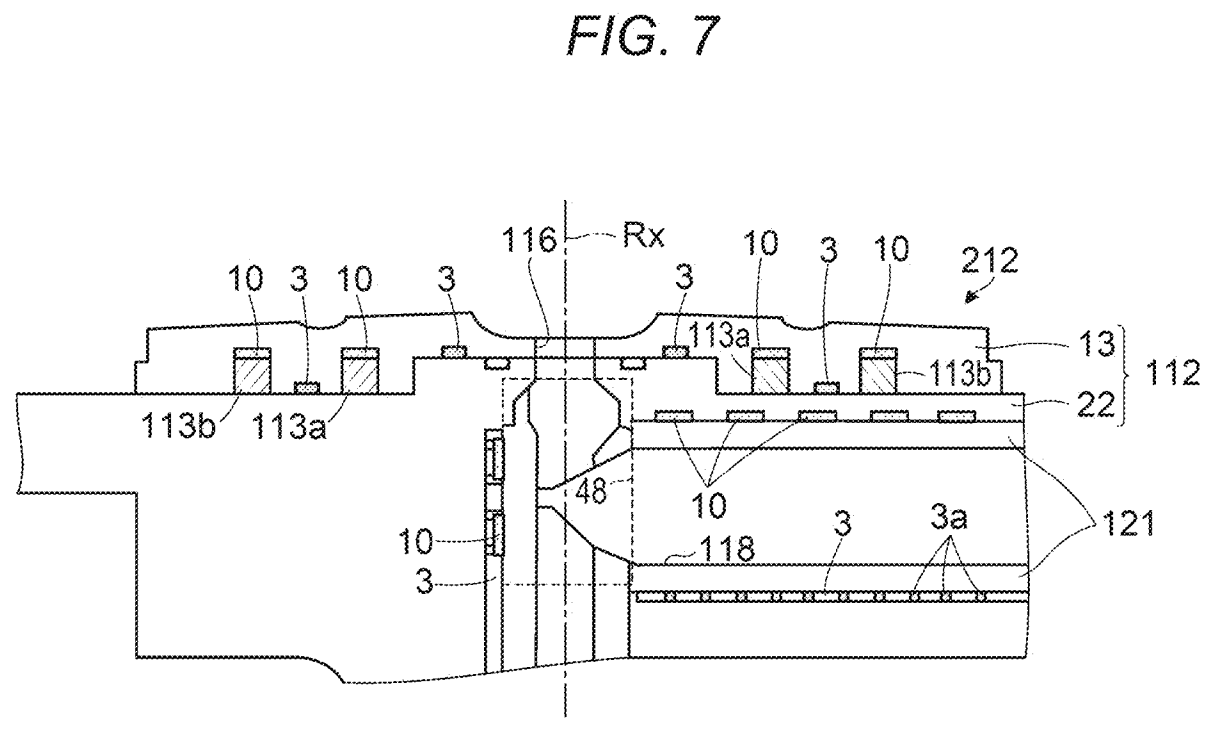

FIG. 7 is a cross-sectional view of a peripheral portion of the barrel.

As shown in FIG. 7, the barrel 112 includes two portions of a third portion 13 and a fourth portion 22. The third portion 13 is a circular plate-shaped portion having the facing surface 212, and is disposed at a center of the fourth portion 22 serving as a base portion. In a preferred example, both the third portion 13 and the fourth portion 22 are made of stainless steel. The first portion 11 and the second portion 21 may be made of aluminum.

As shown in FIG. 7, the plurality of pressure sensors 10 are disposed at portions overlapping the two heaters 113a and 113b. One of the two temperature sensors 3 is concentrically disposed between the communication hole 116 and the heater 113a. The other one is concentrically disposed between the heater 113a and the heater 113b.

As shown in FIG. 7, the pressure sensors 10 and the temperature sensors 3 are also disposed outside the cylinder 121. Specifically, a plurality of pressure sensors 10 are disposed along an extending direction of the cylinder 121 on an outer side of the cylinder 121 on a barrel 112 side. One temperature sensor 3 is disposed along the extending direction of the cylinder 121 on the outer side of the cylinder 121 on an opposite side from the barrel 112 side. Thus, a state of the material in a branch flow path 118 in the cylinder 121 can be grasped.

In FIG. 7, a portion surrounded by a dotted line including a merging portion with the branch flow path 118 on a downstream of the communication hole 116 is referred to as a check valve holding portion 48. The pressure sensors 10 and the temperature sensors 3 are also disposed outside the check valve holding portion 48.

Optimal Molding Condition Derivation Method

As described in JP-10-138310A described above, when the molding conditions are derived only by a flow simulation technique using a computer aided engineering (CAE) analysis, only a part of factors affecting quality can be taken into account, and there is a possibility that a deviation from a molding result in an actual molded product occurs. Specifically, with respect to a complicated phenomenon in which a wide variety of variable factors in injection molding, such as parameters of molding conditions, the number of components to be taken, a gate arrangement of a mold, dimension values are combined, only a part of factors affecting quality characteristics can be defined by the simulation technique alone, and a deviation from a molding result in an actual molded product occurs. In addition, quality variations occur depending on a control error for each additional facility and a control time difference between the facilities, a size relationship differs depending on the conditions and component shapes, and thus, it is difficult to derive optimal molding conditions using the simulation technique of the related art alone.

In view of this problem, in the embodiment, first, a flow simulation according to a CAE analysis is performed using basic information such as a shape and a material of a component, and the number of components to be taken, and standard molding conditions are created.

Next, the injection molding is actually performed in the injection molding apparatus 700 under molding conditions in which predetermined parameters in the standard molding conditions are changed, and inspection data obtained by inspecting the molded product is collected. The molded product data in which the inspection data and the molding condition in which the predetermined parameter is changed are associated is collected for each changed molding condition.

Data analysis including a regression analysis or a multiple regression analysis is then performed on a plurality of pieces of collected molded product data to find out a parameter contribution rate and optimal conditions specific to a component, and derive the optimal molding conditions for the component.

FIG. 8 is a list showing an example of parameters of molding conditions.

Table 71 of FIG. 8 is a list of parameters of molding conditions in the molding device 220.

As shown in Table 71, the parameters are divided into three fields: a plasticizing device field, an injection control mechanism field, and a measurement relation field.

The plasticizing device field includes parameters in the molding device 220 (FIG. 3). For example, a screw rotation speed is a rotation speed of the flat screw 111. A barrel temperature is a temperature of the barrel 112. In addition, there are parameters such as a shear stress and a viscosity of the plasticized material.

The injection control mechanism field includes parameters in the injection control mechanism 120 (FIG. 3). For example, a cylinder temperature is a temperature of the cylinder 121, and a cylinder internal pressure is an internal pressure of the cylinder 121. In addition, there are parameters such as a pressure holding time and a filling time. The measurement relation field includes parameters of a measurement relation between the cylinder 121 and the plunger 122 of the injection control mechanism 120. For example, there are parameters such as a measurement time and a measurement completion position.

The parameters of the molding conditions are different for each component. The parameters are set according to the basic information such as the shape and the material of the component, and the number of components to be taken.

FIG. 9 is a list showing an example of basic information of components. FIG. 10 is a table showing an example of standard molding conditions.

Table 72 of FIG. 9 is a list showing basic information of a component 73. The component 73 is a rotary-top-shaped component having a rotation shaft at a center of a disc-shaped roller.

As shown in Table 72, the basic information includes a component shape, a size, a material, a type of the material, the number of components to be taken, and a gate type. In the component shape and the size describe W indicating a diameter of the roller and a reference value of a weight of the component 73.

Table 74 of FIG. 10 is a list showing standard molding conditions generated by performing the flow simulation according to the CAE analysis based on the basic information of the component 73. The standard molding conditions are not limited to being generated by the simulation, and any molding conditions suitable for the component may be used, for example, molding conditions that reflect a part of molding conditions of similar components may be used.

As shown in Table 74, specific numerical values of the barrel temperature, an injection speed, a holding pressure, a maximum injection pressure, the screw rotation speed, and the like are shown as parameters of the standard molding conditions. For example, the barrel temperature has a set value of the standard molding condition of 210° C.

Method For Collecting Molded Product Data

Figure 11:
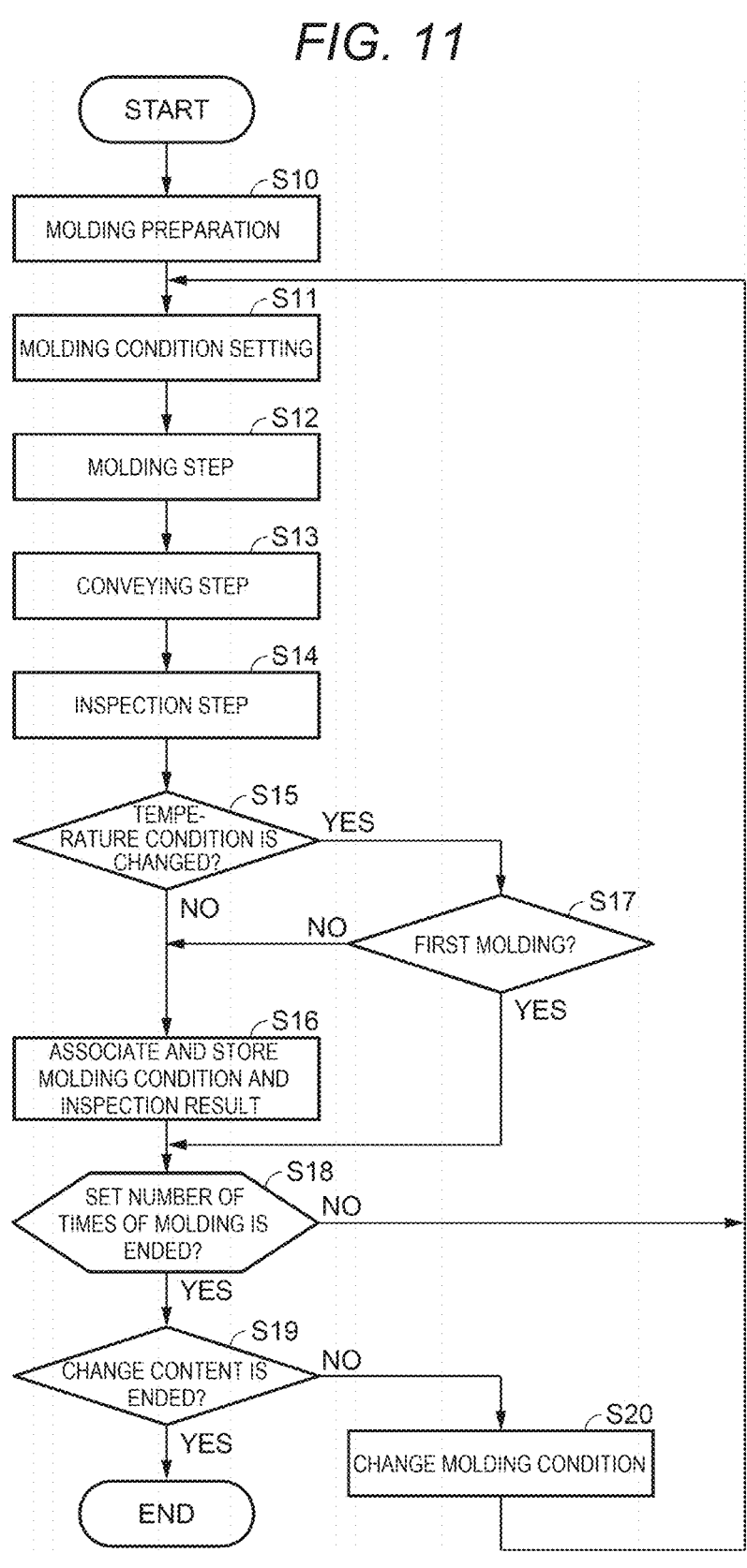
FIG. 11 is a flowchart showing a flow of a method for collecting inspection data of a molded product.

FIG. 11 is a flowchart showing a flow of a method for collecting inspection data of a molded product. FIG. 12 is a table showing an example of the molded product data.

Here, the flow of the method for collecting the inspection data of the molded product will be described mainly with reference to FIG. 11, appropriately with reference to other drawings. The component 73 is taken as an example of the molded product, and the basic information and the standard molding conditions of the component 73 are as described above.

In step S10, the injection molding apparatus 700 is prepared in order to collect the inspection data of the molded product. Specifically, a mold for the component 73 is set in the molding device 220, and a material for the component 73 is put in the material dryer 521. In the computer 30 of the control device 100, the molded product data collection program of the first storage unit 33 is executed. In the program, while changing the barrel temperature in the standard molding conditions of the component 73 in increments of 5° C. in a range of 200° C. to 215° C., five shots of molding performed at each temperature will be described. The change content of the molding condition is received by the first processing unit 35 of the computer 30 functioning as the reception unit 36, and the change content is transmitted to the controller 230 of the injection molding apparatus 700.

In step S11, the control device 100 transmits, to controller 230, molding conditions in which the molding condition is changed in accordance with the change content received by the reception unit 36. An initial second molding condition is a molding condition in which the barrel temperature is changed from that in the standard molding conditions to 200° C.

In step S12, the controller 230 sets the changed molding condition to the molding device 220 to form the molded product. This process corresponds to a first control. In other words, in the first control, the molded product is formed by the molding device 220 under the second molding condition in which the parameter is changed in accordance with the change content received by the reception unit 36.

In step S13, the transport device 250 and the formed molded product are moved to the inspection device 430, the formed molded product being moved by the robot 420.

In step S14, an appearance inspection and a weight inspection of the molded product are performed by the inspection device 430. Specifically, the imaging unit 431 images the molded product, an inspection on appearance including the shape of the molded product is performed by analyzing the captured image, and then the weight measurement unit 432 measures the weight. At this time, when the number of components to be taken is plural, the inspection is performed for each cavity. The analysis of the captured image is performed by the server 50 of the control device 100.

In step S15, the control device 100 determines whether a mold temperature and the barrel temperature as the change content different from the standard molding condition are included in the changed molding condition. When the temperature condition is included, the process proceeds to step S17. When the temperature condition is not included, the process proceeds to step S16. In the case of the component 73, since the barrel temperature is changed, the process proceeds to step S17.

In step S16, the control device 100 associates, as the molded product data, the changed molding condition with an inspection result, obtained by the inspection device 430, of the molded product formed under the molding conditions, and stores the molded product data in the second storage unit 53 of the server 50. This process corresponds to a third control. Table 75 in FIG. 12 is an example of the molded product data, and is data in which physical properties in the basic information of the component 73, the second molding condition, and the inspection data are associated. Indexes of the molded product data are a component number, a cavity number, and the number of times of shots. Although the physical properties are also included in Table 75 as a preferred example, it is sufficient that the second molding condition and the inspection data are associated together with the molded product data. As will be described in detail later, in the inspection data of Table 75, the shape and dimension are determined as non-standard and defective.

In other words, in the third control, the second molding condition and the inspection result, obtained by the inspection device 430, of the molded product formed under the second molding condition are associated and stored in the second storage unit 53. Preferably, for each cavity, the second molding condition and the inspection result, obtained by the inspection device 430, of the molded product formed under the second molding condition are associated and stored in the second storage unit 53.

In step S17, the control device 100 determines whether the molded product is a first molded product formed under the changed molding conditions. When the molded product is the first molded product, the process proceeds to step S18. When the molded product is not the first molded product, the process proceeds to step S16. Here, when the mold temperature or the barrel temperature is changed, it takes time for the temperature to stabilize, and thus when the temperature changes, the first molded product containing unstable elements is excluded from inspection targets.

In other words, when the control device 100 causes a plurality of molded products to be formed under each molding condition, and the mold temperature or the barrel temperature as the change content different from the standard molding conditions is included in the second molding condition, the inspection device 430 does not perform the inspection at least on the first molded product formed under the second molding condition. The first molded product may be subjected to the inspection, but in this case, the inspection result thereof is not used as the molded product data.

In step S18, the control device 100 determines whether the number of times of molding set by the molded product data collection program is reached. When the set number of times of molding is reached, the process proceeds to step S19. When the set number of times of molding is not reached, the process returns to step S11. In the case of the component 73, it is set to perform five shots of molding at each temperature, and thus, the control device 100 determines whether five times of molding is reached.

In step S19, the control device 100 determines whether the change content set by the molded product data collection program is reached. When the change content is reached, the program ends. When the change content is not reached, the process proceeds to step S20. In the case of the component 73, since the change content is changing the barrel temperature in increments of 5° C. in the range of 200° C. to 215° C., the control device 100 determines whether collection of the molded product data at 215° C. is ended.

In step S20, the control device 100 changes the molding condition of the controller 230 in accordance with the change content. This process corresponds to a second control. In the case of the component 73, after the second molding condition in which the barrel temperature is 200° C. is ended, the molding condition is changed to the third molding condition in which the barrel temperature is 205° C. In other words, in the second control, the molded product is formed by the molding device 220 under the third molding condition in which the same parameter as the parameter changed in the first control is changed. In the fourth control, the third molding condition and the inspection result of the molded product formed under the third molding condition are associated and stored in the second storage unit 53. By repeating these processes, in the case of the component 73, the collection of the molded product data is performed by a plurality of shots of molding under each molding condition in which the barrel temperature is changed in increments of 5° C. in the range of 200° C. to 215° C.

Analysis Based on Molded Product Data

Figure 14:
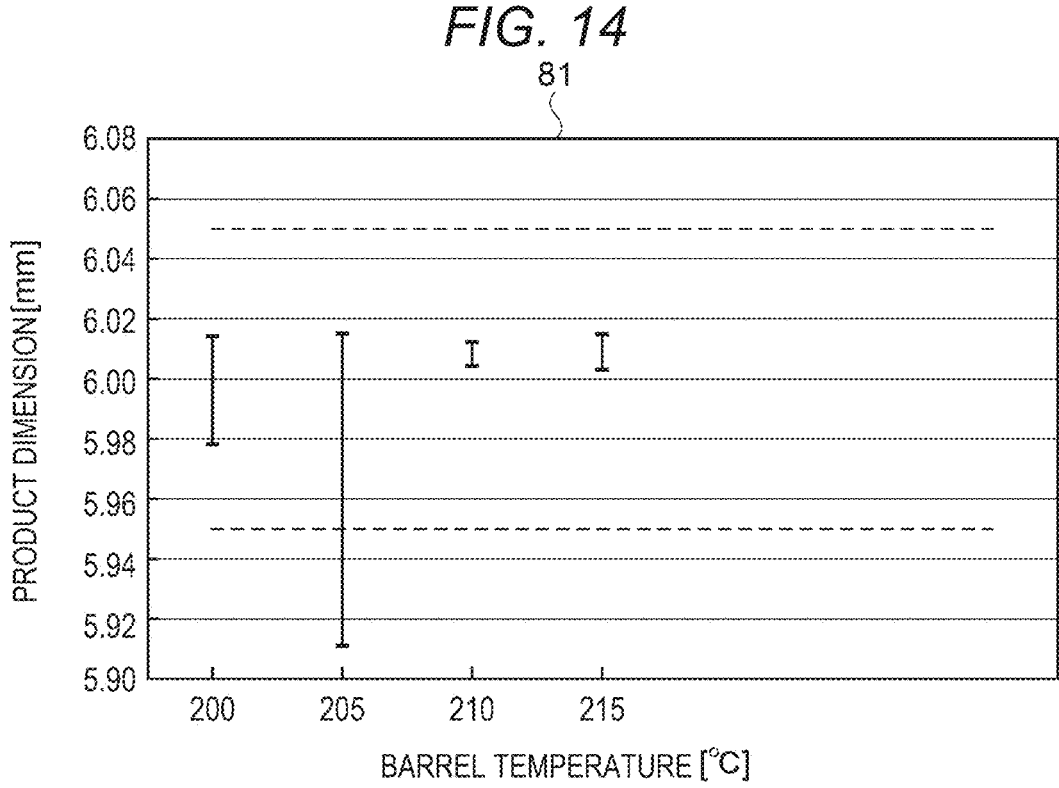
FIG. 14 is a graph showing a correlation between the barrel temperature and a measurement dimension.
Figure 15:
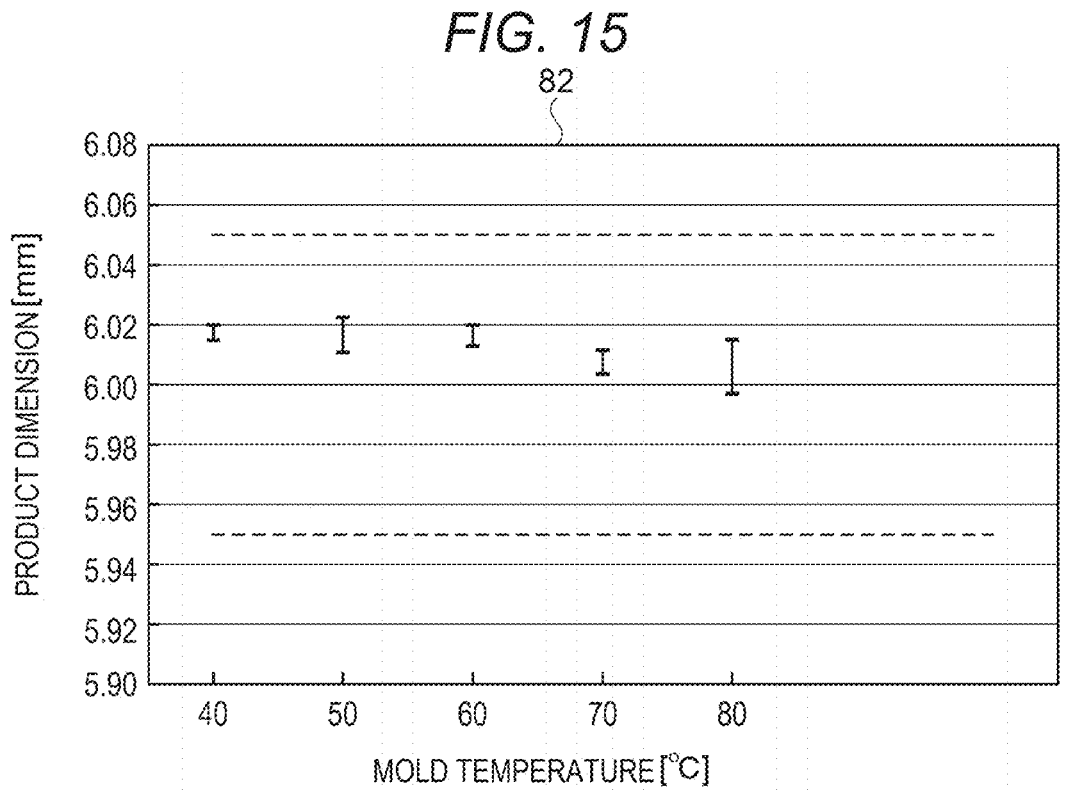
FIG. 15 is a graph showing a correlation between a mold temperature and the measurement dimension.

FIG. 13 is a table showing a correlation between the barrel temperature and the inspection result. FIG. 14 is a graph showing a correlation between the barrel temperature and a measurement dimension. FIG. 15 is a graph showing a correlation between the mold temperature and the measurement dimension.

Table 80 of FIG. 13 is a list of inspection results when the barrel temperature of the component 73 in the second molding condition is changed in increments of 5° C. from 200° C. to 215° C. The barrel temperature of the standard molding conditions is 210° C.

An inspection result of the shape when the barrel temperature was 200° C. was NG. It can be seen that an image 76 is a captured image of the molded product at this time, and as can be seen from comparison with a non-defective image 78, a contour is distorted and an internal pattern is also non-uniform. This is presumed to be due to insufficient filling of the material. A diameter dimension of a disk portion of the component 73 is also non-standard.

An inspection result of the shape when the barrel temperature was 205° C. was also NG. An image 77 is a captured image of the molded product at this time, and although the image 77 is improved from the image 76, the distortion of the contour and the non-uniformity of the internal pattern are observed. This is presumed to be due to the insufficient filling of the material, and the diameter dimension is also non-standard. When such a defect occurs in a specific cavity, an output indicating that there is an abnormality in the molding pattern 12 may be performed, for example, on the display unit 31 of the computer 30. In other words, in a plurality of times of molding performed under the second molding condition, the control device 100 outputs an output indicating that there is an abnormality in the molding pattern 12 when a rejected product is generated in a specific cavity.

An inspection result of the shape when the barrel temperature was 210° C. was GOOD. The image 78 is a captured image of the molded product at this time, and the contour being a clean circle and the internal pattern without any disturbance are observed. The filling of the material is sufficient, and the diameter dimension is also standard.

An inspection result of the shape when the barrel temperature was 215° C. was GOOD. An image 79 is a captured image of the molded product at this time, and similarly to the image 78, the contour being a clean circle and the internal pattern without any disturbance are observed. The filling of the material is sufficient, and the diameter dimension is also standard.

Graph 81 of FIG. 14 is a graph showing the correlation between the barrel temperature described above and the measurement dimension, with a horizontal axis representing the barrel temperature (° C.) and a vertical axis representing the diameter dimension (mm). A standard value of the diameter dimension is 6.00±0.05 mm.

As shown in Graph 81, it can be seen that when the barrel temperature is 205° C., the diameter dimension is equal to or less than a lower limit of the standard value. That is, it can be seen that the barrel temperature is a parameter requiring attention since defects can occur even when the barrel temperature is lowered by 5° C. from the set value of the standard molding condition. The correlation between the barrel temperature and the diameter dimension can be obtained by a regression analysis.

Graph 82 of FIG. 15 is a graph of the correlation between the mold temperature and the measurement dimension, with a horizontal axis representing the mold temperature (° C.) and a vertical axis representing the diameter dimension (mm). The graph shows inspection results when the mold temperature of the component 73 in the second molding condition is changed in increments of 10° C. from 40° C. to 80° C. The mold temperature of the standard molding condition is 70° C., and the standard value of the diameter dimension is 6.00±0.05 mm.

As shown in Graph 82, even when the mold temperature changes, the change in the diameter dimension is small, and is all within the standard value. The correlation between the mold temperature and the diameter dimension can be obtained by a regression analysis. Here, when Graph 81 and Graph 82 are compared, it can be seen that the parameter having a higher contribution rate in relation to the dimension is the barrel temperature.

In the above description, the barrel temperature and the mold temperature are used as an example, but a similar analysis can be performed for other parameters as well. Specifically, a correlation between the parameter and the inspection data can be obtained by a regression analysis or a multiple regression analysis, and by using analysis results, parameters that have a high contribution rate to the standard value and target quality can be specified by calculation and analysis. In the embodiment, the calculation and analysis are performed by the calculation unit 52 of the server 50. Then, the control device 100 displays the correlation between the second molding condition and the inspection result and the contribution rate in the second molding condition on, for example, the display unit 31. In other words, the control device 100 outputs at least one of the correlation between the second molding condition and the inspection result and the contribution rate in the second molding condition.

A combination of a plurality of parameters may be changed. For example, the molded product data may be collected while a combination of both parameters of the mold temperature and the barrel temperature is changed little by little.

Figure 16:
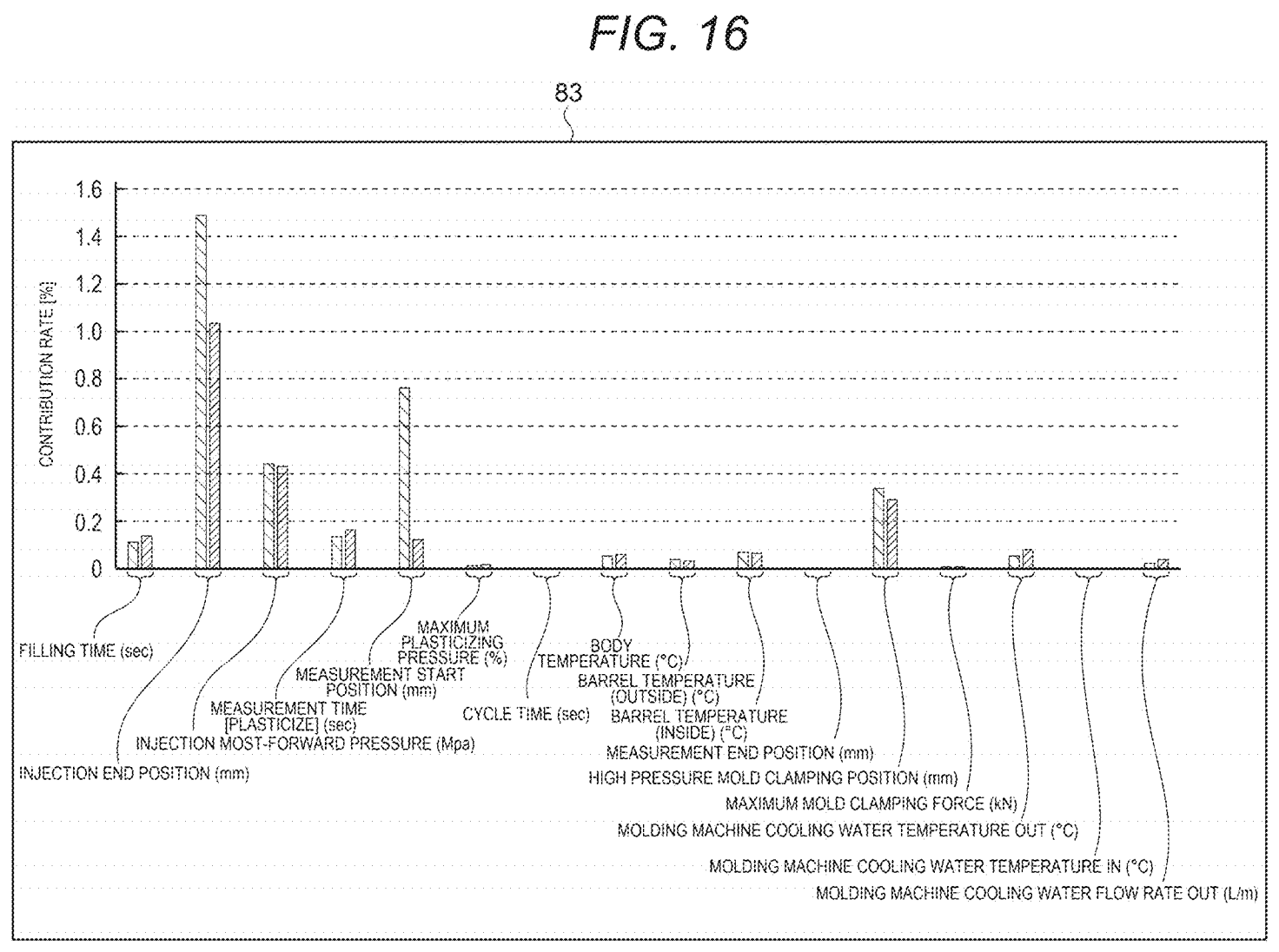

FIG. 16 is a graph showing a contribution rate of each parameter to a molding condition.

In Table 83 of FIG. 16, a horizontal axis represents the parameters of the molding conditions, and a vertical axis represents the contribution rate (%) to the molding conditions. Table 83 is a graph obtained by executing the above-described molded product data collection program for each parameter on two components to be taken that are different from the component 73, collecting and accumulating a plurality of pieces of molded product data, and performing calculation and analysis in the server 50 using the accumulated data. As the contribution rate (%) increases, the parameter has a higher contribution rate. Bar-graph 84 indicates a cavity 1, and Bar-graph 85 indicates a cavity 2.

As shown in Table 83, a parameter having a highest bar-graph is an injection end position (mm). It can be seen that the injection end position is a parameter representing an injection amount of the material, and is a parameter that should be carefully controlled in this component. Based on this, a more optimal molding condition can be derived. That is, by determining the molding condition by changing the parameter contribution rate or a priority of a condition setting based on a shape and a quality characteristic of the component, it is possible to make a condition in accordance with a product. Alternatively, after specifying a parameter having a high contribution rate, a more optimal molding condition may be stored in the first storage unit 33, and the molding condition may be read and set. In other words, the control device 100 reads the second molding condition having a high contribution rate from the first storage unit 33 based on a shape of the molded product and physical properties of the material, and transmits the second molding condition to the reception unit 36.

As described above, according to the injection molding system 800 in the embodiment, the following effects can be obtained.

An injection molding system 800 includes: a molding device 220 configured to discharge a material into a molding pattern 12 and perform injection-mold to form a molded product according to a molding condition; an inspection device 430 configured to inspect at least one of a shape and a weight of the molded product; a robot 420 configured to convey the molded product from the molding device 220 to the inspection device 430; and a control device 100. The control device 100 includes a first storage unit 33 and a second storage unit 53, and a reception unit 36 configured to receive a change content of a parameter included in a standard molding condition which is the predetermined molding condition, and the control device executes a first control of causing the molding device 220 to form the molded product under a second molding condition in which the parameter is changed in accordance with the change content received by the reception unit 36, a second control of causing the molding device 220 to form the molded product under a third molding condition in which the same parameter as the parameter changed in the first control is changed, a third control of associating the second molding condition with an inspection result, obtained by the inspection device 430, of the molded product formed under the second molding condition and storing the association in the second storage unit 53, and a fourth control of associating the third molding condition with the inspection result of the molded product formed under the third molding condition and storing the association in the second storage unit 53, and the third molding condition is a condition different from the second molding condition.

In a preferred example, a flow simulation according to a CAE analysis is performed using basic information such as a shape and a material of a component, and the number of components to be taken, and standard molding conditions are created.

Next, the injection molding is actually performed in the injection molding apparatus 700 under molding conditions in which predetermined parameters in the standard molding conditions are changed, and inspection data obtained by inspecting the molded product is collected. The molded product data in which the inspection data and the molding condition in which the predetermined parameter is changed are associated is collected for each changed molding condition. Data analysis including a regression analysis or a multiple regression analysis is performed on a plurality of pieces of collected molded product data, so that a parameter contribution rate and optimal conditions specific to a component can be found out, and the optimal molding conditions for the component is derived. That is, by adding, to the standard molding condition, the information obtained from the molded product data according to the molded product that is actually formed under the changed molding condition, it is possible to generate more optimal molding conditions with less deviation from the molding result in the actual molded product.

Accordingly, it is possible to provide the injection molding system 800 capable of deriving more optimal molding conditions.

In addition, the control device 100 outputs data on at least one of a correlation between the changed parameter and the inspection result, and a contribution rate of the changed parameter to the inspection result.

Accordingly, more optimal molding conditions can be derived by using the correlation and the contribution rate.

Further, the control device 100 stores, in the second storage unit 53, an association in which the molding condition, the inspection result of the molded product formed under the molding condition, and a physical property of the material are associated for each of a plurality of the molding conditions in which the parameter is changed in accordance with the change content.

Accordingly, more optimal molding conditions can be derived.

The first storage unit 33 stores a plurality of the molding conditions in which the parameter is changed in accordance with the change content, and the control device 100 reads the parameter having a highest contribution rate from the first storage unit 33 based on the shape of the molded product and the physical property of the material, and transmits the parameter to the reception unit 36.

Accordingly, more optimal molding conditions can be derived.

The control device 100 causes the molded product to be formed over a plurality of times under each of the plurality of the molding conditions in which the parameter is changed in accordance with the change content, and does not cause the inspection device 430 to perform the inspection on at least the first molded product when a mold temperature or a barrel temperature is included as the parameter to be changed according to the change content.

Accordingly, effective inspection data can be efficiently collected.

The molding pattern 12 has a plurality of cavities, and the control device 100 forms the molded product for each of a plurality of the cavities under each of the plurality of the molding conditions in which the parameter is changed in accordance with the change content, and stores, for each cavity, an association in which the molding condition and the inspection result, obtained by the inspection device 430, of the molded product formed under the molding condition are associated in the second storage unit 53.

Accordingly, even there are a plurality of components to be taken, more optimal molding conditions can be derived.

Further, in a plurality of times of molding performed under a plurality of molding conditions in which a parameter is changed, the control device 100 outputs an output indicating that there is an abnormality in the molding pattern 12 when a rejected product is generated in a specific cavity.

Accordingly, it is possible to notify the abnormality of the molding pattern 12.

What is claimed is:

1. An injection molding system comprising:
   a molding device configured to discharge a material into a molding pattern and perform injection-mold to form a molded product according to a first molding condition;
   an inspection device configured to inspect at least one of a shape and a weight of the molded product and capture an image of the molded product;
   a robot configured to convey the molded product from the molding device to the inspection device; and
   a control device, wherein the control device includes
      a storage unit, and
      a reception unit configured to receive a change content of a parameter included in a standard molding condition which is a predetermined molding condition, and the control device executes
      a first control of causing the molding device to form the molded product under a second molding condition in which the parameter is changed in accordance with the change content received by the reception unit,
      a second control of causing the molding device to form the molded product under a third molding condition in which the same parameter as the parameter changed in the first control is changed,
      a third control of associating the second molding condition with an inspection result, obtained by the inspection device and including a second image, of the molded product formed under the second molding condition and storing the association in the storage unit, and
      a fourth control of associating the third molding condition with the inspection result of the molded product formed under the third molding condition and storing the association in the storage unit, the association comprising a third image obtained by the inspection device, and
   the third molding condition is a condition different from the second molding condition.

2. The injection molding system according to claim 1, wherein
   the control device outputs data on at least one of a correlation between the changed parameter and the inspection result, and a contribution rate of the changed parameter to the inspection result.

3. The injection molding system according to claim 1, wherein
   the control device stores, in the storage unit, an association in which the molding condition, the inspection result of the molded product formed under the molding condition, and a physical property of the material are associated for each of a plurality of the molding conditions in which the parameter is changed in accordance with the change content.

4. The injection molding system according to claim 2, wherein
   the storage unit stores a plurality of the molding conditions in which the parameter is changed in accordance with the change content, and
   the control device reads the parameter having a highest contribution rate from the storage unit based on the shape of the molded product and the physical property of the material, and transmits the parameter to the reception unit.

5. The injection molding system according to claim 1, wherein
   the control device causes the molded product to be formed over a plurality of times under each of the plurality of the molding conditions in which the parameter is changed in accordance with the change content, and does not cause the inspection device to perform the inspection on at least a first molded product when a mold temperature or a barrel temperature is included as the parameter to be changed according to the change content.

6. The injection molding system according to claim 1, wherein
   the molding pattern has a plurality of cavities, and
   the control device forms the molded product for each of a plurality of the cavities under each of the plurality of the molding conditions in which the parameter is changed in accordance with the change content, and stores, for each cavity, an association in which the molding condition and the inspection result of the molded product formed under the molding condition are associated.

7. The injection molding system according to claim 6, wherein
   the control device outputs an output indicating that there is an abnormality in the molding pattern when a rejected product is generated in the specific cavity in molding performed under the plurality of the molding conditions in which the parameter is changed.

8. The injection molding system according to claim 1, wherein the standard molding condition is derived from computer-aided engineering (CAE) analysis of basic information associated with the molded product, the change content defining a molding process to form a predetermined quantity of molded products with a predetermined sequence to the change of the parameter for the predetermined quantity of molded products as compared to the standard molding condition.

* * * * *